Aug. 23, 1966     C. H. SWOPE ET AL     3,267,807
PLURALITY OF SHIELD UNITS FOR ABSORBING
ENERGY FROM A LASER BEAM
Filed March 12, 1964

INVENTORS
CHARLES HERMAS SWOPE
CHARLES J. KOESTER

BY James O. McAndrews

ATTORNEY

United States Patent Office

3,267,807
Patented August 23, 1966

3,267,807
PLURALITY OF SHIELD UNITS FOR ABSORBING ENERGY FROM A LASER BEAM
Charles H. Swope, Millbury, Mass., and Charles J. Koester, South Woodstock, Conn., assignors to American Optical Company, Southbridge, Mass., a voluntary association of Massachusetts
Filed Mar. 12, 1964, Ser. No. 351,372
3 Claims. (Cl. 88—112)

This invention relates to goggles for protecting the eyes against high intensity radiations from optical masers or lasers.

Optical masers or lasers are characterized by the emission of beams of very intense collimated light or other radiant energy of a very narrow band of wavelengths. These beams of intense radiant energy can be very dangerous even when of very brief duration in that the beams may be inadvertently directed upon or reflected into the eyes where they tend to be concentrated upon the retina by the eye lens and other refractive media of the eye to cause retinal burns and the like. In providing eye protection for scientists and technicians against such laser beams, it is, of course, convenient to employ protective goggles or eye shields for blocking the laser beams but it is also desirable to use eye shields capable of high transmission of visible light so that the shields do not unduly restrict vision. Eye shields of the energy-reflecting type presently known are not adequate for these purposes in that the degree of protection provided by such eye shields depends to an undesirable extent on the angle of incidence of the laser beams upon the eye shields. Further, shields of the energy-reflecting type do not terminate laser beams which are incident upon the shields but merely deflect the dangerous beams in new directions. On the other hand, conventional energy-absorbing eye shields of reasonable weight are inadequate in that such shields must have relatively high coefficients of absorption to provide sufficient protection against laser beams, and such shields tend to craze and shatter in response to thermal shock and the like when exposed to laser beams.

It is an object of this invention to provide novel and improved eye shield means for protecting the eyes against radiant energy emitted from lasers. Further objects of this invention are to provide protective goggles or other eye shield means which can be conveniently worn before the eyes, which are capable of relatively high transmission of visible light, and which furnish satisfactory protection against the radiant energy emitted from lasers. Other objects of this invention are to provide such eye shield means in which the eye protection achieved is substantially independent of the angle of incidence of the laser beams on the eye shields, which absorb and terminate rather than deflect laser beams incident upon the eye shield means, which furnish such eye protection without tending to shatter when exposed to laser beams, and which can continue to provide protection for the eyes even when the eye shield means have been damaged by exposure to excessive amounts of laser energy. It is also an object of this invention to provide such protective goggles or eye shields which are of economical construction, which can be readily adapted to provide protection against laser beams of various intensities and wavelengths, and which are comfortable to wear.

Briefly described, the protective goggle or shield means provided by this invention includes a plurality of light-transmitting shield portions or units and means for mounting the shield portions or units in sequence between a laser and the eyes for protecting the eyes against inadvertent exposure to direct or reflected laser beams. In a practical construction, each individual shield portion or unit has a selected coefficient of absorption and transmits enough of the radiant energy incident thereon from a laser so that the individual shield portion or unit does not absorb an excess amount of heat or laser energy and is not subjected to thermal shock or other injury when struck by a laser beam. However, said coefficient of absorption is such that each individual shield portion or unit also absorbs enough of the radiant energy incident thereon from the laser to assure that the beam of energy transmitted therethrough will be so reduced in intensity that it cannot subject the subsequent shield portion or unit in the sequence to thermal shock or the like such as might cause injury to the subsequent shield portion or unit. The plurality of shield portions or units cooperate in absorbing radiant energy from the laser for protecting the eyes. In a preferred construction where the eye shield means can absorb a particular percentage of the incident laser energy and, therefore, can provide protection for the eyes only against laser beams up to a certain energy level, the individual shield units can have selected absorption coefficients such that they will absorb an excessive amount of laser energy and will tend to craze or shatter when exposed to laser beams above said energy levels. In this way, it can be assured that the eye shield means cannot ordinarily transmit more laser energy than the eye can safely withstand. In a practical construction, the final shield portion or unit in the described sequence can also protect the eyes against splinters or other flying particles in the event that a previous shield portion or unit in the sequence should be shattered by thermal shock or the like on exposure to an intense beam of laser energy.

In this arrangmement, relatively light weight and thin shield portions or units of relatively low absorptive properties can cooperate to provide excellent protection against selected laser beams and can also permit relatively high transmission of visible light of other wavelengths for minimizing interference with vision. Further, each shield portion or unit can comprise one or more separate shield or filter elements as desired and various combinations of the units or elements can be arranged to provide protection against laser beams of various intensities and wavelengths. In addition, each shield unit in the shield means must ordinarily be completely destroyed by a laser beam before the protection it provides for subsequent shield units is substantially reduced. Accordingly, the protective goggle or shield means of this invention can provide protection for the eyes against laser beams of energy levels much greater than those expected to be encountered even though one or more units of the goggle or shield means may be damaged by exposure to such intense laser beams.

Other objects, advantages and details of the protective goggle or shield means provided by this invention appear in the following detailed description of a preferred embodiment of the invention, the description referring to the drawing in which.

Figure 1:
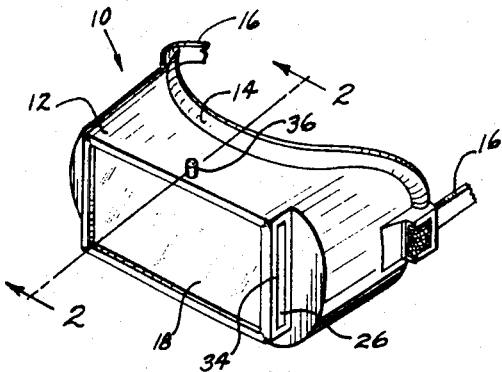
FIG. 1 is a perspective view showing a protective goggle according to this invention.

Referring to the drawing, 10 in FIG. 1 indicates a protective goggle or shield means provided by this invention which is shown to include a frame 12, preferably formed of a flexible but shape-retaining vinyl material. The frame has a flange 14 which can conform to the face and has straps 16 which serve to mount the frame in conventional manner on the face of a scientist or technician who might be exposed to beams of intense radiant energy from lasers or the like.

Figure 2:
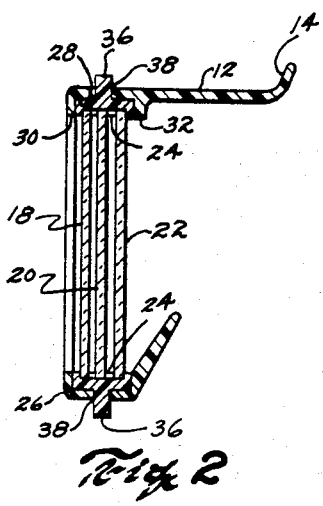
FIG. 2 is a section view along line 2—2 of FIG. 1.
Figure 3:
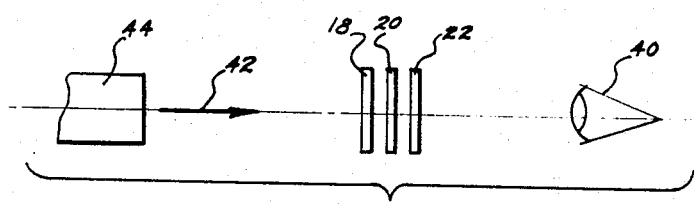
FIG. 3 is a diagrammatic view illustrating the function of the shield units in the goggle of FIGS. 1 and 2.

In accordance with this invention, the frame 12 serves to mount a plurality of shield portions or units in sequence before the eyes of the person wearing the goggle. For example, in the preferred embodiment of the invention shown in the drawings, the frame 12 supports members 18, 20 and 22 in sequential relation to each other, each member comprising a rectangular plate of glass or similar light-transmitting material. These plates can be separated from each other by spacers 24 which extend entirely around the perimeters of the plates, and the plates can be enclosed within a flexible rim or holder 26 which also extends around the perimeter of the plates and which serves to hold the plates together in the assembled relation shown in FIG. 2. The frame 12 forms a chamber or groove 28 between the frame flange 30 and the ridge 32, and the holder 26 together with its enclosed plates 18, 20 and 22 is fitted within the chamber 28 through an opening 34 at one side of the frame as indicated in FIG. 1. A somewhat flexible button 36 on the holder can fit within an aperture 38 in the frame for removably securing the holder in the chamber 28 as will be understood. It should be understood that any other suitable goggle frame or shield support means could also be employed for mounting the plates 18, 20 and 22 in sequence before the eyes within the scope of this invention. For example, the shield portions or units 18, 20 and 22 could be mounted in conventional spectacle frames or could be arranged in suitable supports to be detachably clipped over clear lenses in conventional safety spectacles.

Where the protective goggle 10 is to protect the eye 40 against direct exposure to an intense collimated beam of radiant energy 42 of a particular energy level and wavelength emitted from an optical maser or laser 44 as is diagrammatically illustrated in FIG. 3, the first plate or shield unit 18 preferably comprises an energy filter of relatively low absorption coefficient adapted for partial absorption of radiant energy of the narrow band of wavelengths emitted from the laser 44. The second plate or shield unit 20 also comprises an energy filter, preferably of relatively higher absorption coefficient, and is adapted for absorption of radiant energy of substantially the same band of wavelengths. The first plate 18 preferably absorbs enough energy from the laser beam 42 so that the laser energy transmitted through the plate 18 will not be of sufficient intensity to subject the plate 20 to thermal shock or to cause the plate 20 to craze, flake or shatter. On the other hand, the plate 18 preferably transmits enough energy from the laser beam 42 so that the plate 18 itself does not absorb an excessive amount of laser energy and is not subjected to thermal shock or the like when struck by the laser beam. The plates 18 and 20 cooperate to absorb enough of the laser energy incident thereon to protect the eye 40 from any harmful effects of said radiant energy. The plate 20 disposed between the first plate 18 and the eye 40 also serves to protect the eye against splinters or other flying particles such as might be caused if the plate 18 should be shattered upon exposure to the laser beam 42.

For example, where the laser 44 comprises a neodymium glass laser of 2 millimeters diameter having a 3° beam spread spaced at a distance of 10 centimeters from the plate 18 and is adapted to emit a highly collimated beam of radiant energy of substantially 1.06 microns wavelength, the plates 18 and 20 can embody conventional filter glass materials and can have absorption coefficients of 4.46/mm. and 9.86/mm. respectively for energy of 1.06 microns wavelength, each plate having a thickness of approximately two millimeters. As this plate 18 is of relatively low absorption coefficient, it can withstand exposure to a brief but intense beam 42 from the laser which develops as much as 19 joules of energy within 0.005 second and can absorb part of the laser energy. On the other hand, if the same laser beam developing 19 joules within 0.005 second were directed onto the plate 20 of relatively higher absorption coefficient, the plate 20 would be subjected to thermal shock and would crack and craze with some flaking of the plate material. However, where the same laser beam developing 19 joules within 0.005 second is directed through the plates 18 and 20 in sequence in accordance with the invention, the plates provide adequate protection for the eye 40 against the laser beam without resulting in injury to either plate. That is, the plates 18 and 20 cooperate in absorbing enough of the laser energy for protecting the eye while the plate 18 also serves to protect the plate 20 from extremes of the laser energy.

In a practical construction, the shield units 18 and 20 cooperate to absorb a certain percentage of the energy from an incident laser beam 42 and, therefore, can provide protection for the eyes only against laser beams up to a particular level of energy intensity. That is, if a laser beam of greater energy intensity were directed upon such shield units, the part of the incident laser energy transmitted by the shield units would also be greater and could injure the eyes. In a preferred construction according to this invention, the shield units 18 and 20 can have selected absorption coefficients such that they can absorb enough energy from a laser beam 42 of selected intensity for protecting the eyes but will tend to craze and shatter when exposed to laser beam of greater intensity rather than to transmit an excessive amount of said energy. In this way, the person wearing the protective goggle or shield means 10 can be assured that his eyes are not being exposed to excessive amounts of laser energy as long as the shield means remains in uninjured condition.

However, the protective goggle 10 also inherently provides a substantial degree of protection for the eye 40 against laser beam of much greater energy levels even though the goggle shields or filters 18 or 20 may be damaged by such intense laser energy. For example, where the laser beam 42 is increased in intensity to develop 37 joules within 0.005 second to exceed the capacity of the plates 18 and 20 as above described, the plate 18 crazes to some extent but the plate 20 is not injured and provides the necessary degree of protection for the eye 40. Further, where the laser beam is greatly intensified to develop 740 joules in a 5 mm. spot on the plate within 0.003 second, the plate 18 breaks without resulting in injury to the plate 20 and without causing radiation damage to the eye 40. In fact, the first shield unit 18 usually must be almost completely destroyed before the protection it provides for the second shield unit 20 is substantially reduced. Thus, in absorbing a great deal of energy in being even partially destroyed, the shield unit 18 provides the goggle 10 with substantial protection against laser beams of unexpectedly high energy levels. The plate 20 serves to protect the eye against splinters etc. caused by flaking or breaking of the plate 18 as will be understood. In addition, if desired, the clear glass plate 22 is also mounted in sequence with the filter plates 18 and 20 to provide protection against splinters in the event that the plate 20 is crazed or shattered by an extremely intense laser beam 42. The plate 22 can be considered to form another shield unit or to form part of said second shield unit together with the plate 20.

It should be understood that although two separate spaced shield portions or units 18 and 20 are shown in the illustrated embodiment of the invention together with the clear glass plate 22, more than two shield portions or units can be used and the shield portions or units and the plate can also be placed in direct contact with each other in the described sequence, can be laminated together by fusing or by means of adhesives or can comprise layers of material of different coefficients of absorption in a single member within the scope of this invention. Further, although the plates 18 and 20 cooperate to absorb energy of the wavelengths emitted by the laser, the plates are preferably adapted both for absorption of enough laser energy to provide the necessary degree of eye protection and for relatively high transmission of visible light of other wavelengths, thereby to permit relatively clear vision through the plates. The plates are also relatively thin so that the overall weight of the goggle can be quite low and so that the goggle can be comfortably worn. In a practical construction, the plates 18 and 20 are each adapted for peak absorption of energy of the laser wavelength but the other absorbing properties of the plates are not identical and do not supplement or strengthen each other to any great extent. Alternatively, one or both shield units 18 and 20 or even the plate 22 can be adapted to absorb radiant energy other than that of the laser beam 42. For example, the plates can be adapted to absorb radiant energy of ultraviolet, or other wavelengths emitted by the laser pumping means (not shown). It should also be understood that although a particular embodiment of the protective goggle of this invention has been described by way of illustration, this invention includes all modifications and equivalents thereof which fall within the scope of the appended claims.

We claim:

1. A light-transmitting shield for protecting eyes against a beam of laser energy of selected wavelength where the intensity of said beam is sufficient to destroy a homogeneous filter substantially opaque to said energy, said shield comprising a plurality of shield units and means adapted to mount said units in sequence between a laser and the eyes, said shield units each being primarily adapted for absorption of laser energy of said selected wavelength and for relatively lesser absorption of visible light energy of other wavelengths, said shield units each being sufficiently transmissive to laser energy of said selected wavelength to avoid destruction of said unit upon exposure of said shield to a laser beam of said intensity, said shield units each being adapted to absorb sufficient laser energy of said selected wavelength to prevent destruction of subsequent shield units in said sequence upon exposure of said shield to a laser beam of said intensity, said shield units being adapted to cooperate in substantially completely absorbing a laser beam of said intensity and selected wavelength for protecting the eyes.

2. A light-transmitting shield as set forth in claim 1 wherein each shield unit preceding a subsequent shield unit in said sequence has a relatively lower coefficient of absorption for laser energy of said selected wavelength than said subsequent shield unit.

3. A light-transmitting shield as set forth in claim 2 embodying two shield units which are substantially transparent to visible light of predetermined wavelengths, said shield units each being of approximately two millimeters thickness and having coefficients of absorption of 4.46 per millimeter and 9.86 per millimeter respectively for laser energy of approximately 1.06 microns wavelength.

References Cited by the Examiner

UNITED STATES PATENTS

| | | | |
|---|---|---|---|
| 2,903,700 | 9/1959 | Finken et al. | 2—10 |
| 3,016,543 | 1/1962 | Lindblom | 2—14.9 |
| 3,104,176 | 9/1963 | Hovey | 117—333 |
| 3,112,490 | 12/1963 | Malcolm | 2—8 |
| 3,118,781 | 1/1964 | Downing | 117—33.3 |
| 3,126,295 | 3/1964 | Young | 252—300 X |

FOREIGN PATENTS 71,659  12/1942  Czechoslovakia.

JORDAN FRANKLIN, *Primary Examiner.*

J. R. BOLER, *Assistant Examiner.*